(No Model.)  5 Sheets—Sheet 1.

J. LOBNITZ.
PANEL RAISING MACHINE.

No. 312,364. Patented Feb. 17, 1885.

WITNESSES:  
F. McArdle  
C. Sedgwick

INVENTOR:  
J. Lobnitz  
BY  
ATTORNEYS.

(No Model.)  5 Sheets—Sheet 2.

J. LOBNITZ.
PANEL RAISING MACHINE.

No. 312,364.  Patented Feb. 17, 1885.

WITNESSES:  INVENTOR:

(No Model.) 5 Sheets—Sheet 3.
J. LOBNITZ.
PANEL RAISING MACHINE.
No. 312,364. Patented Feb. 17, 1885.
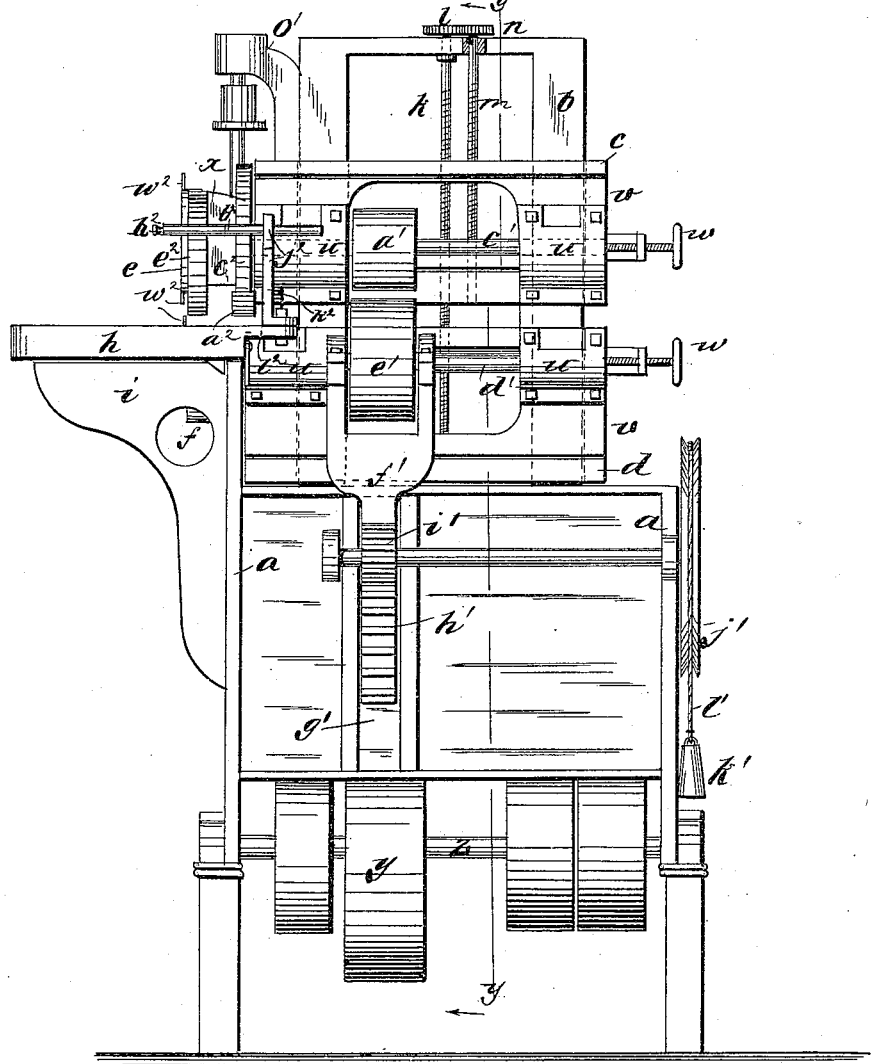
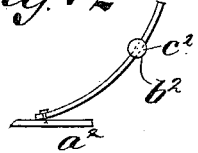
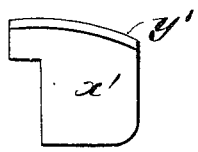
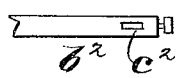
WITNESSES:
INVENTOR:
J. Lobnitz
BY
ATTORNEYS.

(No Model.)
J. LOBNITZ.
PANEL RAISING MACHINE.
No. 312,364. Patented Feb. 17, 1885.
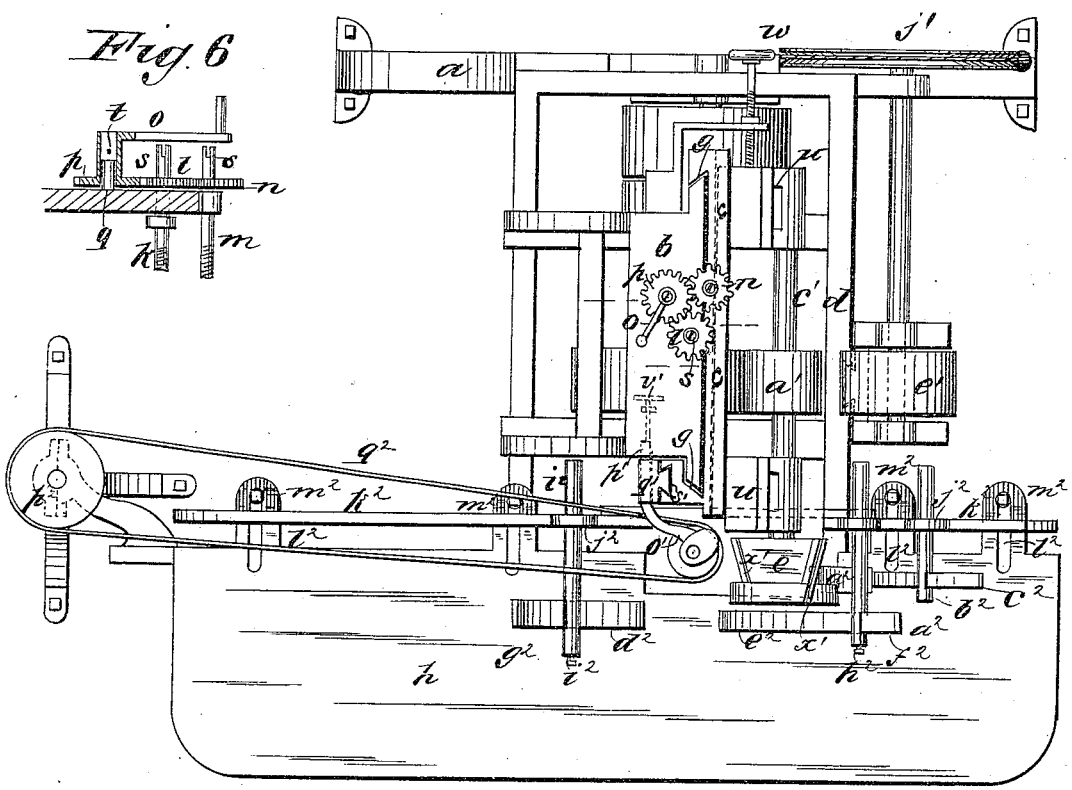
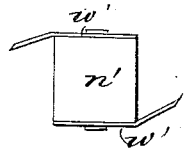
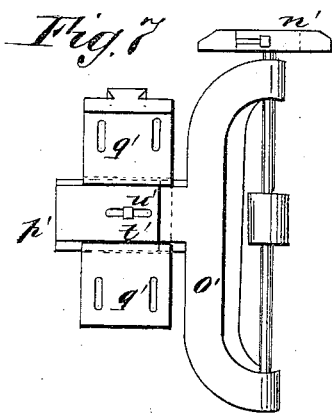
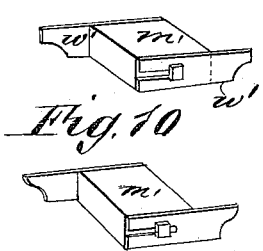
WITNESSES:
F. McArdle.
C. Sedgwick.
INVENTOR:
J. Lobnitz
BY
ATTORNEYS.

(No Model.)
J. LOBNITZ.
PANEL RAISING MACHINE.
No. 312,364. Patented Feb. 17, 1885.
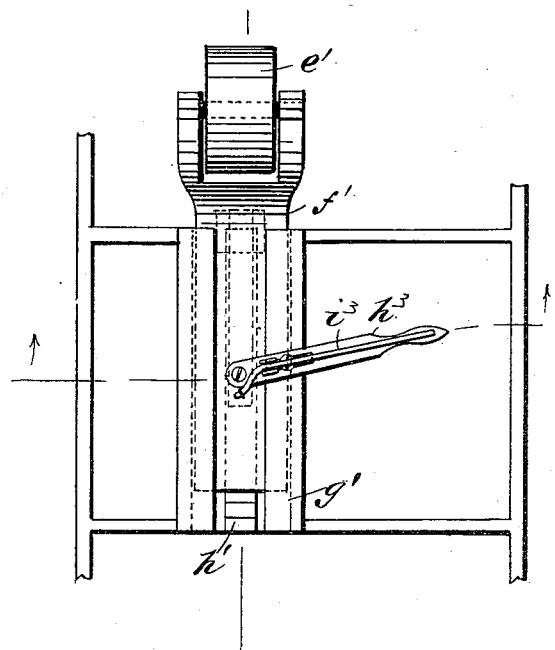
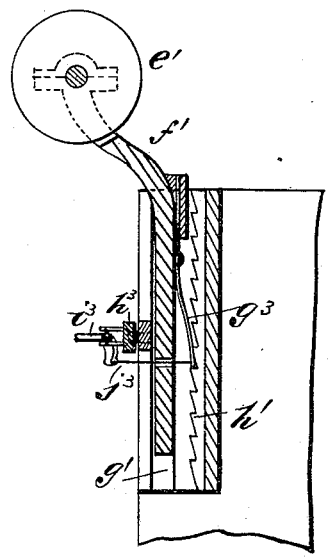
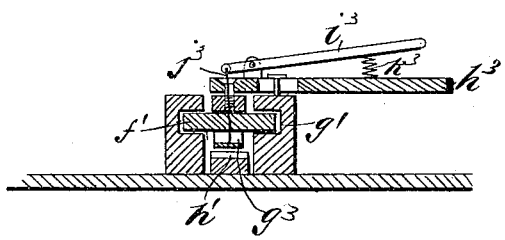
WITNESSES:
INVENTOR:
J. Lobnitz
BY
ATTORNEYS.

UNITED STATES PATENT OFFICE.

JULIUS LOBNITZ, OF MADISONVILLE, OHIO.

PANEL-RAISING MACHINE.

SPECIFICATION forming part of Letters Patent No. 312,364, dated February 17, 1885.

Application filed October 24, 1884. (No model.)

*To all whom it may concern:*

Be it known that I, JULIUS LOBNITZ, of Madisonville, in the county of Hamilton and State of Ohio, have invented a new and Improved Panel-Raising Machine, of which the following is a full, clear, and exact description.

My invention consists of improvements in contrivances for mounting, adjusting, and operating the cutter-heads; also of improvements in the cutters; also of an improved contrivance of the table, and also of improvements in the contrivance of the chip-breaker and the gages for controlling the work, all as hereinafter fully described.

Reference is to be had to the accompanying drawings, forming part of this specification, in which similar letters of reference indicate corresponding parts in all the figures.

Figure 1:
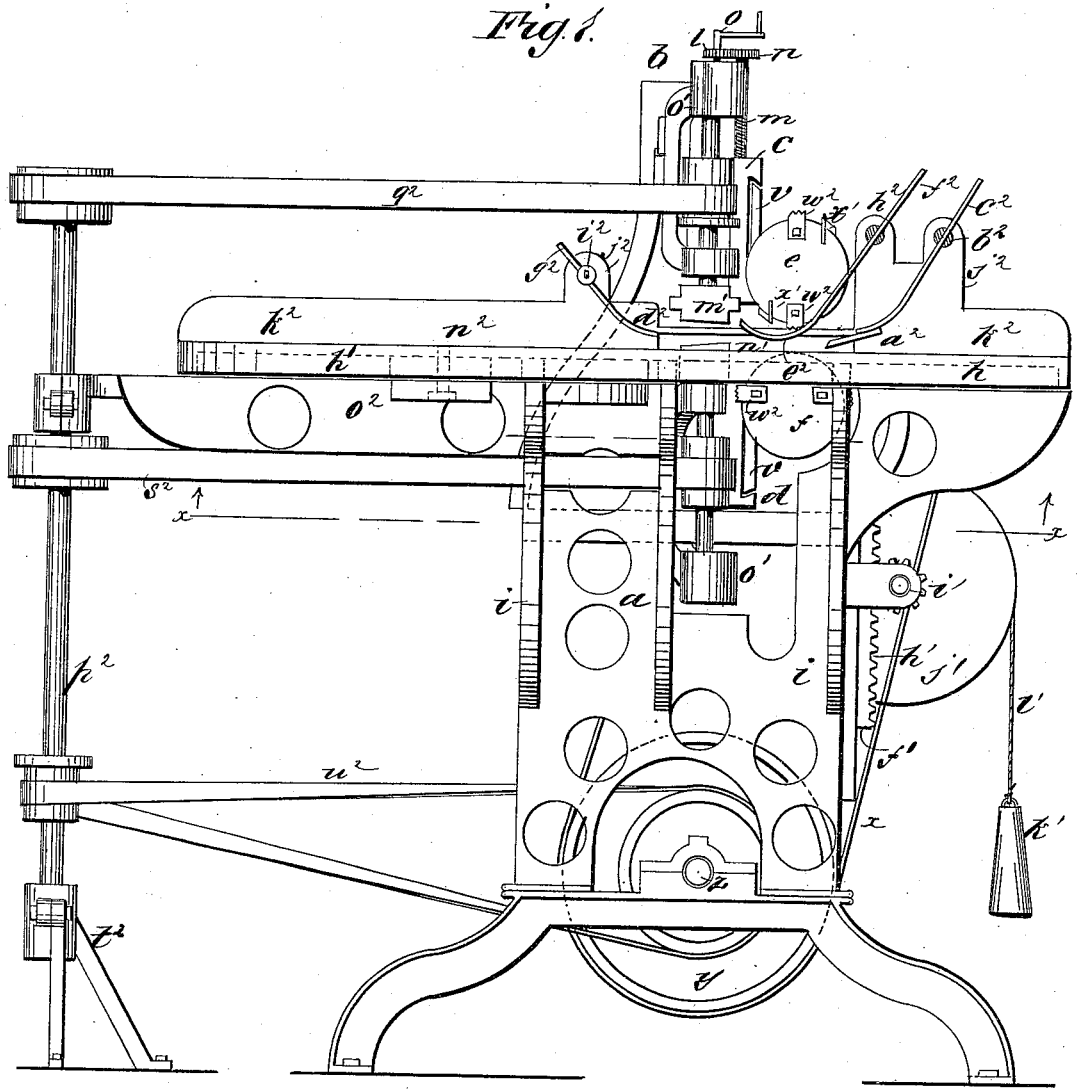
Figure 2:
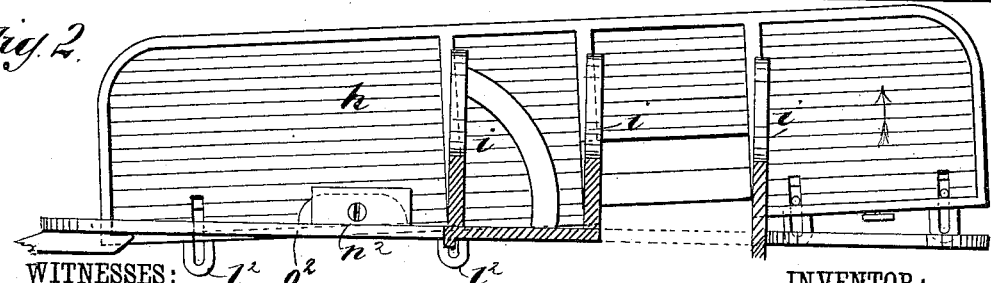
Figure 3:
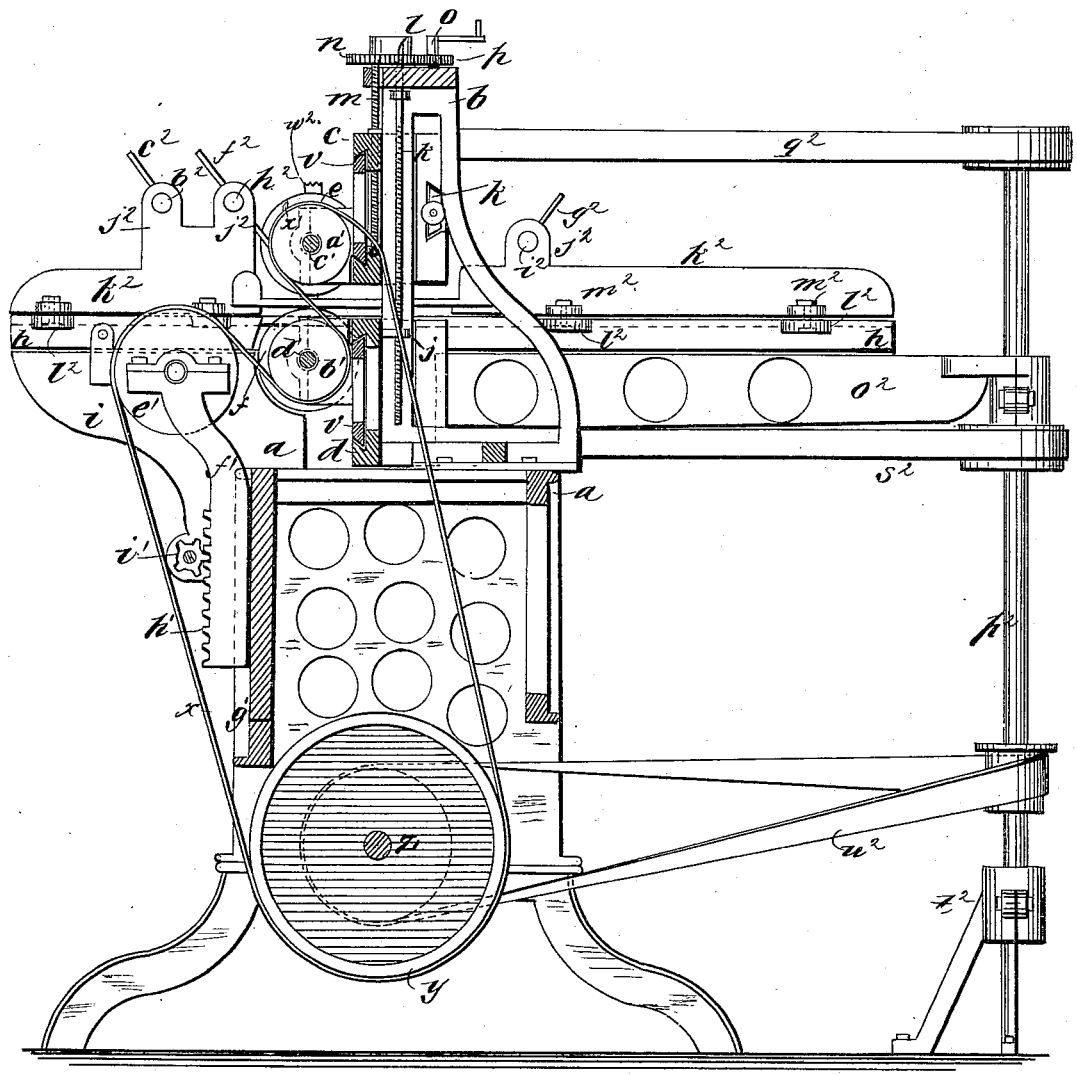

Figure 1 is a side elevation of my improved machine. Fig. 2 is a horizontal section of the frame on line $x\ x$ of Fig. 1, showing the table inverted. Fig. 3 is a longitudinal sectional elevation on the line $y\ y$ of Fig. 4. Fig. 4 is a front end elevation. Fig. 5 is a plan view. Fig. 6 is a detail, in section, of the adjusting devices for the main or surface cutter-heads. Fig. 7 is a side elevation of the lower edge cutter-head and its supports. Fig. 8 is a plan view of one of the edge cutter-heads, showing an angular form in which I arrange the bits. Figs. 9 and 10 are perspective views of one of the edge cutter-heads, showing modified forms of the edges of the bits for different forms of the edges of the panels. Fig. 11 is a back view of a bit for the main cutter-heads, showing the form in which I propose to construct said bits. Figs. 12 and 13 are details of the chip-breaker, and Figs. 14, 15, and 16 are details of my improved belt-tightener.

On the top of the bed-frame $a$, I arrange a vertical support, $b$, to which I fit the upper and lower slide-rests, $c$ and $d$, for the upper and lower horizontal cutter-heads, $e$ and $f$, respectively, by dovetail guides $g$, so that said cutter-heads may be readily shifted up or down to set them to the upper and lower surfaces of the lumber to be dressed, which is placed on the table $h$, suitably located for passing the material along between the cutter-heads, said table being supported a suitable height above the top of the bed-frame $a$, for the purpose, by the brackets $i$, cast together with said bed-frame. The lower slide-rest, $d$, is connected by a nut, $j$, with the adjusting-screw $k$, fitted in the top of frame $b$, and having a toothed wheel, $l$. The upper slide-rest $c$ is suspended by the adjusting-screw $m$, also having a toothed wheel, $n$. These wheels $l$ and $n$ are to gear with a socket-crank, $o$, by a wheel, $p$, when both screws are to be turned together for shifting both slide-rests up or down together, the crank being then placed on the stud-pivot $q$, suitably arranged for enabling said wheel $p$ to gear with both wheels $l$ and $n$ at once; but when either slide-rest is to be shifted independently of the other the socket-crank is to be removed from the stud-pivot $q$ and placed on the slotted upper end, $s$, of the adjusting-screw, to turn it by a pin, $t$. that drops into the slot. The bearing-boxes $u$ of the mandrels of the cutter-heads $e$ and $f$ are mounted on the respective slide-rests $c$ and $d$ by transverse slides $v$, which are fitted with adjusting-screws $w$, by which the cutter-heads may also be adjusted transversely to the work, which is also required, as well as the vertical adjustments. For driving these cutter-heads by one belt, $x$, the said belt, which runs from the drum $y$ on the main shaft $z$, is passed reversely around the pulleys $a'\ b'$ of the cutter-mandrels $c'\ d'$ to give the right direction to the cutting-bits and thence to the tightener $e'$. This tightener is mounted on a vertically-sliding stock, $f'$, arranged in a vertical slideway, $g'$, and geared by the toothed rack $h'$ and pinion $i'$ with a drum, $j'$, which is counterbalanced by a weight, $k'$, suspended from it by a cord, $l'$, allowing the tightener $e'$ to shift readily according as the belt $x$ is taken up or let out by the shifting of the cutter-heads up and down along the ways $g'$, and at the same time maintaining the proper tension; but while this counterbalanced tightening device may be used with good results, what I prefer to use and claim herein consists of the toothed rack $h'$, fixed in the bottom or back of the slideway $g'$, with a spring-pawl, $g^3$, attached to the sliding stock suitably to engage said rack and prevent the idler from being forced down by the belt $x$; a hand-lever, $h^3$, by which to raise and lower the tightener, and a tripping-lever, $i^3$, to release the spring-pawl $g^3$, said tripping-lever being mounted on the hand-lever, and connected to the spring-pawl $g^3$ by a cord, $j^3$, and having a coiled spring, $k^3$, for retracting it, and all being arranged substantially as represented in Figs. 14, 15, and 16. The upper and lower edge cutter-heads, $m'$ and $n'$, are mounted on the upper and lower slide-rests, $c$ and $d$, respectively, so as to be shifted together with them, and they are also mounted on said slide-rests so that they may be adjusted both vertically and toward and from the edges of the lumber to be dressed. They are mounted in the heads of the T-shaped supports $o'$, the stems of which $p'$ are fitted to slide transversely in the slides $q'$, that are fitted to shift vertically on the dovetail slide-ways $s'$, attached to the slide-rests $c$ and $d$, respectively, the cross-slides $p'$ being so arranged that said edge cutter-heads will be shifted toward and from the edges of the work to set them for wide or narrow panels, and according as the bits of said cutters are to form wide or narrow rabbets of the panels. These slides $p'$ and $q'$ may be adjusted by hand and be secured by bolts $t'$ and slot-holes $u'$, simply, or they may be fitted with adjusting hand-screws $v'$.

I propose to construct the bits $w'$ in the angular form represented in Fig. 8, to project the cutting-edges ahead more than if said bits were made straight, which has the advantage of increasing the length of the cutting-edge for a given breadth of cut on the work and enables the cutters to work easier and cut smoother. The forms of the edges of the cutting-bits are to be varied according to the desired form of the panel-edge. For example, the straight bevel represented in Fig. 8 will be used for a plain bevel-edge, the curved form of Fig. 9 for a round edge, and the form of Fig. 10 for an ogee edge.

I propose to arrange the bits $x'$ of the main cutter-heads oblique to the axis, as represented in Fig. 5, which enables a curved edge, $y'$, Fig. 11, to be used for dressing plane surfaces, increasing the length of the cutting-edge and enabling it to cut obliquely on the work, both of which tend to lessen the power required and to make smoother work, and I arrange the saw-bits $w^2$ on the ends of the main cutter-heads to cut a vertical slit along the work in advance of the bits $x'$, to insure a smoother corner of the shoulder of the rabbet, which the cutters $x'$ are liable to tear and splinter.

In front of the upper main cutter-head I arrange a chip-breaker, $a^2$, which I support in a slotted arm, $b^2$, by a spring-shank, $c^2$, which may be adjusted in the said arm to regulate its position with relation to the cutter-head and to vary the tension of the spring-arm by shifting the latter in the slot of the arm. The spring-shank of the chip-breaker may be held in place by the grip of the jaws of the split arm or by any other approved means, as a set-screw, Figs. 12 and 13.

At the side of the main cutters, and at a suitable distance back of them, I arrange pressure-gages $d^2$ and $e^2$, which I connect by similar spring-shanks, $f^2$ and $g^2$, with similar split supporting-arms, $h^2$ and $i^2$, for holding the work securely until it is well past the cutters. The arms $b^2 h^2 i^2$ are mounted in standards $j^2$ supported on the upper edge of the work-gage $k^2$, in which said arms are to be fitted so as to shift lengthwise for setting the chip-breaker and pressure-gages toward or from said work-gage, and said arms will also be fitted to turn in their bearings for causing the said breaker and gages to press on the work with more or less force, as required, with set-screws or other devices for holding them. The work-gage $k^2$ is adjusted along the slotted lugs $l^2$ of the table for setting it with bolts $m^2$, as required, and the table is fitted to shift away from the cutter-heads over the brackets $i$ by turning on a pivot, $n^2$, when the pivot-bolt is slacked off to remove it for greater facility in taking off and putting on the cutter-heads when required. The pivot $n^2$ is fitted to an arm, $o^2$, which extends rearward from the brackets $i$ and the top of the bed-frame $a$ to support the counter-shaft $p^2$, from which the edge cutter-heads $m'$ and $n'$ are driven by the belts $q^2$ and $s^2$, said shaft being supported in the step $t^2$ at the lower end and being driven by the belt $u^2$ from a pulley on the main shaft $z$.

Having thus fully described my invention, I claim as new and desire to secure by Letters Patent—

1. The combination, in a panel-raising machine, of the upper and lower cutter-heads, $e$ and $f$, arranged on vertical slides $c\,d$ and cross-slides $v$, also the upper and lower edge cutter-heads, $m'$ and $n'$, mounted on the vertical slides $c\,d$, and being adjustable thereon vertically and toward and from the work with the work-holding table, substantially as described.

2. The combination, with the adjusting-screws $k\,m$, of vertical slides $c\,d$, having toothed wheels $l\,n$ and slotted heads $s$, of the socket-crank $o$, having a toothed wheel, $p$, and pin $t$, substantially as described.

3. The combination, in a panel-raising machine, of the pulley $e'$, vertically-sliding support $f'$, disposed parallel with the toothed rack $h'$, spring-pawl $g^3$, connected to said support and engaging said rack, hand-lever $h^3$, and tripping-lever $i^3$, with the driving-belt $x$ and the cutter-mandrel pulleys $a'\,b'$, said cutter-mandrels being differentially adjustable on the vertical frame $b$, substantially as described.

4. The T-shaped edge cutter-supports $o'$, having arms $p'$, adjustable into the slides $q'$, vertically adjustable on the ways $s'$, attached to the vertically-adjustable slide-rests $c\,d$, substantially as described.

5. The combination, in a panel-raising machine, of the upper and lower cutter-heads having the bits $x'$, arranged obliquely to said heads, and having the curved cutting-edges $y'$, said cutter-heads being disposed on vertical slides $c\,d$ and cross-slides $v$, together with the upper and lower edge cutter-heads, $m'$ and $n'$, mounted on the vertical slides $c\,d$, and adjustable thereon vertically and toward and from the work and the work-table, substantially as and for the purpose set forth.

6. The combination, in a panel-raising machine, of the upper and lower cutter-heads, $e$ and $f$, arranged on vertical slides $c\,d$ and cross-slides $v$, together with the upper and lower edge cutter-heads, $m'$ and $n'$, having bits $w'$, provided with cutting-surfaces standing at an obtuse angle to their shanks, said upper and lower edge-cutters being mounted upon the vertical slides $c\,d$, and adjustable thereon vertically and toward and from the work and the work-table, substantially as and for the purpose set forth.

7. The combination, in a panel-raising machine, with the cutter-heads and work-table, of the chip-breaker located in advance of the cutter-heads, pressure-gage $e^2$, located at the sides of said cutter-heads, and the pressure-gage $d^2$, located back of the cutter-heads, substantially as described.

8. The work-gage $k^2$, having means for its connection to the work-table, and standards $j^2$, supporting the arms of the chip-breaker and pressure-gage, substantially as described.

9. The work-table $h$, arranged on the pivot $n^2$ and fitted on the supporting-bracket $i$, together with adjusting-screws and their slots for shifting away from the cutter-heads, substantially as herein shown and described.

JULIUS LOBNITZ.

Witnesses:
LOUIS W. CLASON,
JAMES GIFFIN.